United States Patent
Povalyayev et al.

(10) Patent No.: US 10,110,610 B2
(45) Date of Patent: Oct. 23, 2018

(54) DYNAMIC PERMISSION ASSESSMENT AND REPORTING ENGINES

(71) Applicant: SAP SE, Wallforf (DE)

(72) Inventors: Viktor Povalyayev, Santa Clara, CA (US); Senthil Chinnathambi, Fremont, CA (US); Alex Hsu, Fremont, CA (US); Lata Krishnamohan, Saragota, CA (US)

(73) Assignee: SAP SE, Walldorf (DE)

( * ) Notice: Subject to any disclaimer, the term of this patent is extended or adjusted under 35 U.S.C. 154(b) by 105 days.

(21) Appl. No.: 14/962,229

(22) Filed: Dec. 8, 2015

(65) Prior Publication Data

US 2017/0163651 A1 Jun. 8, 2017

(51) Int. Cl.
*H04L 29/00* (2006.01)
*H04L 29/06* (2006.01)
*G06F 17/30* (2006.01)
*G06F 21/62* (2013.01)

(52) U.S. Cl.
CPC ...... *H04L 63/102* (2013.01); *G06F 17/30312* (2013.01); *G06F 17/30575* (2013.01); *G06F 21/6218* (2013.01); *H04L 63/105* (2013.01); *H04L 63/1433* (2013.01)

(58) Field of Classification Search
CPC ....... H04L 63/102; H04L 63/08; H04L 63/20; H04L 63/105
See application file for complete search history.

(56) References Cited

U.S. PATENT DOCUMENTS

| | | | |
|---|---|---|---|
| 6,289,462 B1* | 9/2001 | McNabb | G06F 21/6218 726/21 |
| 2011/0167483 A1* | 7/2011 | Lee | H04L 63/0823 726/6 |
| 2011/0277017 A1* | 11/2011 | Ivanov | G06F 21/6218 726/4 |
| 2013/0159049 A1* | 6/2013 | Arumugam | G06Q 10/063 705/7.28 |

* cited by examiner

*Primary Examiner* — Ghazal B Shehni
(74) *Attorney, Agent, or Firm* — Jones Day

(57) ABSTRACT

Methods and systems of the present disclosure provide techniques for dynamically assessing a permission of a user that one of modifies or adds at least one content change in a source environment. The methods may further assess the permission of the user when the at least one content change relates to role content data or functional content data. The permissions of the users may be evaluated based on rule data specific to the source environment or user assignment data relating to the source environment. In addition, the disclosure provides techniques for reporting the dynamic assessment to an administrator based on a triggering event.

20 Claims, 8 Drawing Sheets

| Function ID | Action | System | Action Assessment ID | Active |
|---|---|---|---|---|
| JA11 | VA01 | GF8CLNT500 | A1122334455 | X |
| JA11 | VA01 | GI7CLNT600 | A9988776655 | |

| Action Assessment ID | Resource ID | Permission Assessment ID |
|---|---|---|
| A1122334455 | V_VBAK_ATT | P1122334455 |
| A1122334455 | K_KER_TC | P2233445566 |
| A1122334455 | K_KEKO | P3344556677 |
| A9988776655 | V_VBAK_ATT | P9988776655 |
| A9988776655 | K_KER_TC | P8877665544 |
| A9988776655 | K_KEKO | P7766554433 |

FIG. 2C

| Permission Assessment ID | Sequence | Resource Extn | Value From | Value To | Condition | Active |
|---|---|---|---|---|---|---|
| P1122334455 | 1 | BUKRS | US01 | | AND | x |
| P1122334455 | 2 | BUKRS | JP02 | | AND | x |
| P1122334455 | 3 | KOKRS | CA01 | | AND | x |
| P1122334455 | 4 | KOKRS | CA02 | | AND | |
| P2233445566 | 1 | BUKRS | US02 | | OR | x |
| P2233445566 | 2 | BUKRS | JP02 | | OR | x |
| P2233445566 | 3 | KLVAR | 12 | | OR | x |
| P2233445566 | 4 | KLVAR | 11 | | OR | x |

FIG. 2D 208

| Assessment ID | Groupd ID | Sequence | Resource Extrn | Value From | Value To | Condition |
|---|---|---|---|---|---|---|
| A1122334455 | 1 | 0 | TCD | VA01 | | |
| P1122334455 | 1 | 1 | BUKRS | US01 | | AND |
| P1122334455 | 1 | 2 | KOKRS | CA01 | | AND |
| P1122334455 | 2 | 1 | BUKRS | US01 | | AND |
| P1122334455 | 2 | 2 | KOKRS | CA02 | | AND |
| P1122334455 | 3 | 1 | BUKRS | JP02 | | AND |
| P1122334455 | 3 | 2 | KOKS | CA01 | | AND |
| P1122334455 | 4 | 1 | BUKRS | JP02 | | AND |
| P1122334455 | 4 | 2 | KOKRS | CA02 | | AND |
| P2233445566 | 1 | 1 | BUKRS | US02 | | OR |
| P2233445566 | 1 | 2 | BUKRS | JP02 | | OR |
| P2233445566 | 1 | 3 | KLVAR | 12 | | OR |
| P2233445566 | 1 | 4 | KLVAR | 11 | | OR |

| Role Name (PFCG) | System | Assessment ID |
|---|---|---|
| AP_CLERK | GF8CLNT500 | A1122334455 |
|  | GI7CLNT600 | A9988776655 |
|  | GF8CLNT500 | P1122334455 |
|  | GF8CLNT500 | P2233445566 |
| AP_MANAGER | GF8CLNT500 | P1122334455 |

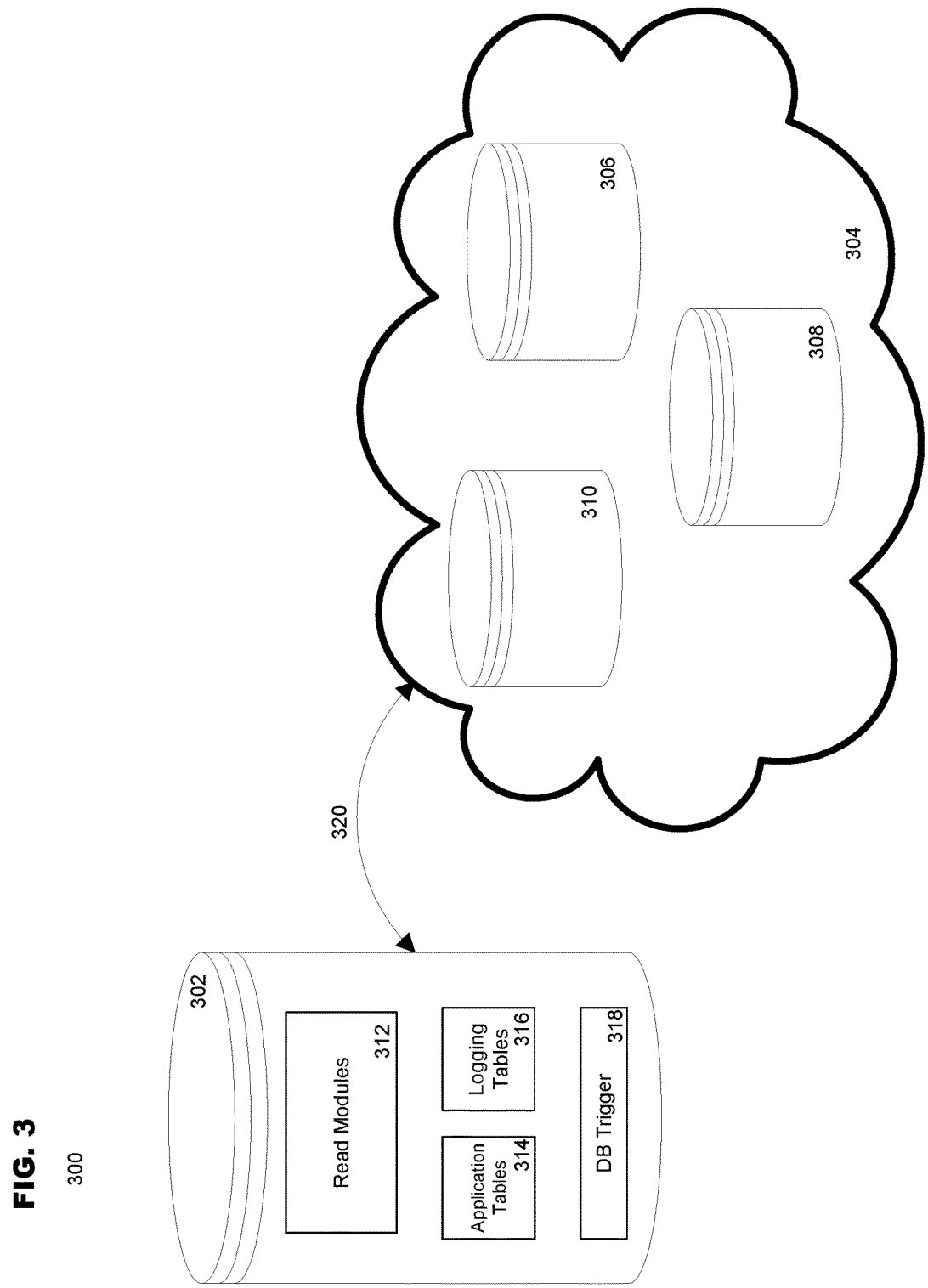

DYNAMIC PERMISSION ASSESSMENT AND REPORTING ENGINES

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD

Methods and systems for dynamically assessing a permission of a user that one of modifies or adds at least one content change in a source environment; and, in addition, for reporting the dynamic assessment to an administrator based on a triggering event.

BACKGROUND

Large companies employ numerous employees and these employees operate their respective company's systems to execute a variety of tasks. Such large companies have found that reviewing and monitoring the authorization level of their employees and the executed tasks is time-consuming and inefficient. However, the review of employees and their system usage is important in order to: ensure efficient operation, avoid wasteful overlaps, control the unauthorized sharing of confidential information, and effectively report on compliance with rules by technologies, people, processes, and information.

Accordingly, these large companies have adopted real-time ad-hoc Risk Analysis (RA) software and associate systems to perform these monitoring tasks on their behalf. In Enterprise Resource Planning (ERP) systems, customers use Risk Analysis (RA) to comply with an owner's provided audit requirements. RA is generally implemented to detect Segregation of Duties (SoD) violations, which indicate whether different users and tasks involved in the ERP systems are properly authorized to: create, delete, access (read, write, send), and manipulate different portions of the ERP systems.

When the conventional RA is implemented, analysis can be extremely time-consuming. Moreover, the time-consuming analysis must be completed in order for the customer to be provided with the audit report. Each time the user requests the report, a full analysis of the system must be repeated. The audit report is typically in the form of an SoD analysis report.

ERP systems performing the conventional RA generally access, analyze, and report the status of RA applications in accordance with the following. First, each database that is a part of the ERP system and governed by the RA audit must be accounted for. Then, each accounted for database has all of its data rules and authorization rules synchronized onto a backend environment. After the full synchronization of all of the databases, the backend system compares the synchronized data rules and authorization rules to a pre-defined set of rules stored at the backend.

The analysis of the conventional RA is generally time consuming for several reasons. One reason is that each time an RA is executed, the RA acts as a trigger to initiate the RA process. Only upon the trigger does the ERP system identify which data tables are needed and then proceeds to pull relevant data from those identified data tables in the source systems. After having identified and accessed the relevant data, the ERP system proceeds to check each role, action, and permission level from the accessed data according to a pre-defined set of rules.

The comparison results from the check are stored and used to generate the SoD analysis report. Each time, however, a database associated with the ERP system expands to account for data developments or changes in local infrastructure associated with the company, additional unknown and unconfirmed data exists locally in the source system that has not been subjected to a RA by the ERP system.

The assessment report is historically only stored, in conventional RA, after a full compare is run. The assessment report is then stored locally upon the customer's device. The assessment report includes information regarding what violation occurred, which parties were responsible, and which tasks triggered the violation. In convention applications, violation reports are often presented to the users at consistent intervals. For example, violation reports may be presented month by month.

In many environments, such as Information Technology (IT) environments, multiple ERP systems are used as source data based on customer needs and requirements. Similarly, customer needs and requirements result in the multiple ERP systems handling a high volume of RAs. Due to the voluminous number of ERP systems needed for these environment systems, conventional RA has not been scalable.

In addition, scalability is further complicated given that high volume maintenance activities are often required. In some circumstances, the amount of maintenance is driven due to the various plug-in dependencies of each of, or some of, the ERP systems and edge components associated with the ERP systems. Conventional RA, sometimes referred to herein as ad-hoc RA, is also not scalable because any synchronization of the ERP systems requires a great deal of time. In many environments, the data to be accessed for the RA is voluminous and constantly increasing as the database tables grow to support various customer needs.

Furthermore, the procedure to execute the real-time ad-hoc RA requires a large amount of memory on the backend server environment. The generation of the SoD analysis report further consumes significant application-specific programming memory.

Accordingly, there is a need for methods and systems to dynamically assess user permissions and report the assessment to an administrator of a system, without delay, in response to a triggering event.

BRIEF DESCRIPTION OF THE DRAWINGS

FIG. 2A is an illustration of a portion of the assessment mapping 200 that is performed by the permission assessment engine.

FIG. 2B is an illustration of a portion of the assessment mapping 200 that is performed by the permission assessment engine.

FIG. 2C is an illustration of a portion of the assessment mapping 200 that is performed by the permission assessment engine.

FIG. 2D is an illustration of a portion of the assessment mapping 200 that is performed by the permission assessment engine.

FIG. 2E is an illustration of a portion of the assessment mapping 200 that is performed by the permission assessment engine.

FIG. 3 is an illustration of an Architectural Overview 300 of the layout and relationship between the source system and the target system, which includes the permission assessment engine.

DETAILED DESCRIPTION

Example embodiments of the present invention provide for methods and systems for dynamically assessing a permission of a user that modifies or adds at least one content change in a source environment; and, in addition, for reporting the dynamic assessment to an administrator based on a triggering event.

The dynamic SoD RA model described herein is, in some embodiments, executed on a complete cloud based software as a service (SaaS). In some embodiments, a portion of the SoD RA model is executed on the cloud. In some embodiments, the SoD RA model is executed entirely in a wired network. The dynamic SoD RA model described herein is scalable and secure. In particular, the dynamic SoD RA model described herein is used to solve issues arising in access control as they relate to governance, risk, and compliance (GRC). The invention operates in real-time and remains scalable irrespective of the number of systems implemented in the governance hierarchy. Similarly, the invention remains scalable irrespective of the amount of data controlled and/or reviewed by the governance hierarchy.

In some embodiments, the SoD RA model described herein is implementable in an environment with mixed tenants. In other words, in scenarios in which an overarching governance is desirable but in which the different entities do not wish to or are unable to share proprietary and/or confidential information, the SoD RA model interfaces with a relational database management system to encrypt the data of the mixed tenants as necessary. In one embodiment, the relational database management system performing the encryption with and according to the SoD RA model is SAP HANA (high-performance analytical appliance).

The solution provided by the dynamic SoD RA model described herein is capable of operating alongside a conventional RA model in a seamless manner.

The dynamic SoD RA model is integrated into a relational database management system for easy on-loading and off-loading of data and package simplification. In an example embodiment, the SoD RA model is integrated with S4/HANA in either on-premises solutions or on-cloud solutions.

Figure 1:
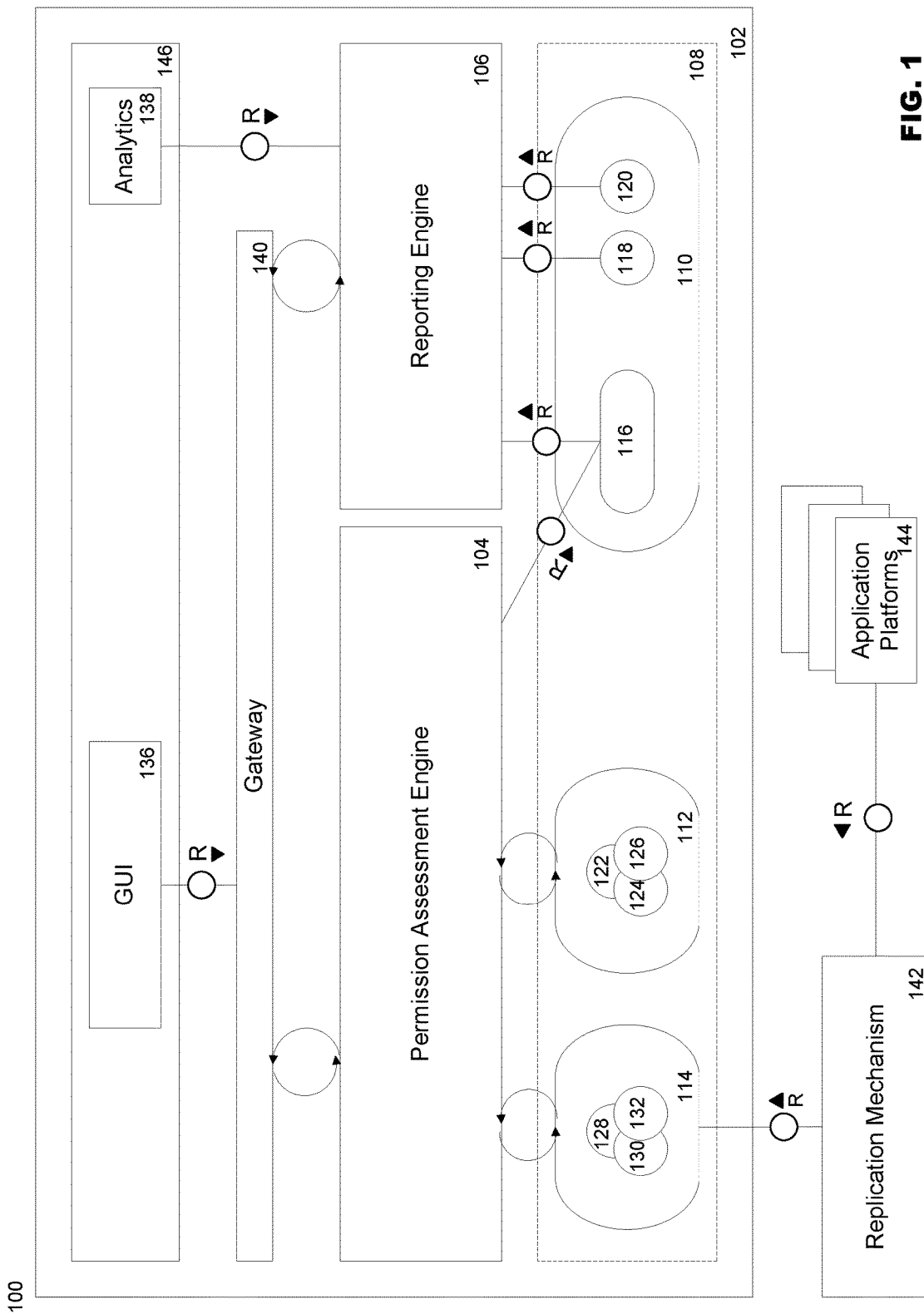
FIG. 1 is an illustration of a dynamic segregation of duties risk assessment system 100, including the permission assessment engine and the reporting engine that are in communication with a source system.

FIG. 1 is an illustration of a dynamic segregation of duties risk assessment system 100, including the permission assessment engine and the reporting engine.

The dynamic segregation of duties risk assessment system 100 includes a source system and a target system. Authorization data is stored on the source system. The target system includes a target database and associated processing device, and the source system includes a collection of source databases and associated processing devices. The authorization data includes, in some embodiments, role information. In some embodiments, the authorization data includes profile information. In an example embodiment, the authorization data includes both role information and profile information. The authorization data, or a relevant portion thereof, is replicated by the dynamic segregation of duties risk assessment system. Replication is performed by a replication mechanism that is capable of being selected by one of ordinary skill in the art. In an example embodiment, the replication mechanism is SLT (SAP Landscape Transformation). The replication is performed by replicating objects and/or data from the source system onto a target system as objects and/or data. The target system is capable of executing the SoD RA model as described herein, and the target system has access to the predefined authorization data. In some embodiments, the target system is HANA.

The replication, by the replication mechanism, is triggered automatically whenever authorization data is provisioned and/or changed. For example, a replication trigger is generated when a user of the source system creates a new role. In another example, a replication trigger is generated when a user of the source system changes the authorization settings associated with a particular previously established profile. The rules for establishment of a trigger are maintained on the target system, or on a database accessible by the target system. In an example embodiment, the trigger rules are maintained in SAP Access Control on HANA. The trigger rules are configurable or updateable by a designated administration. The trigger rules are otherwise configurable or updateable according to the governance provided in the predefined rules.

Based on the role of the replication trigger, the trigger is executed in real-time based on the permission assessment. Therefore, the execution of the trigger is performed in real-time and is executed independently from a trigger that initiates reporting. Due to the execution of the replication trigger on an events-driven basis, there is no need to download and execute an entire comparison upon the trigger, as was previously performed by the conventional model. The permission assessment is performed at the permission group level. The permission group level is the lowest granular level in the permission hierarchy, and is not part of the access control levels (i.e., risk/rule level). The permission assessment is constantly executed in the background of the ERP system, even before a consumer executes a request for an audit report.

Role information contains authorization data or objects that indicate to what extent users can access, modify, or influence other data. For example, roles limit a user's ability to access or manipulate transactions, reports, and web-based applications. Users are, as is generally known in information systems, entered into a role based system such that their formal name is associated with a username and a role. This system is formally executed by associations of objects within object classes such that each user is associated with at least one authorization object and at least one authorization role. Multiple roles may form a composite role that is in turn associated with a plurality of authorization objects and authorization roles.

In some embodiments, the replication trigger is driven by a Perfectly Functionally Co-coordinating Group (PFCG) role change. In some embodiments, the replication trigger is driver by an AC function change. In some embodiments, the replication trigger is driven by both the PFCG role change and the AC function change. A change, as described herein, refers to when the permission content for a role or function is added, deleted, or modified. The permission content change occurs generally upon a transaction between a consumer or administrator and the associated database. Upon such changes, the replication trigger is executed and a delta assessment is triggered. A delta assessment determines only the operations necessary to update the current objects from the source system. After completion of the assessment, the assessment result is stored locally for reporting to the consumer, typically at a later point in time.

When the RA is executed during runtime, the violation reports are generated from the information available in the local storage. The recovery of data from local storage, without a comparison at the time of the request, results in a minimal processing time.

FIG. 1 includes a dynamic segregation of duties risk assessment system 100, including the permission assessment engine and the reporting engine that are in communication with a source system.

A significant portion of the system 100 is hosted by a network server 102. In some embodiments, the network server 102, sometimes described herein as a platform, is a Web based service-oriented application and integration platform. In some embodiments, platform 102 is SAP NetWeaver. Permission Assessment Engine 104 is hosted by the network server 102. Reporting Engine 106 is also supported by the network server 102. Network server 102 further hosts a relational database management system 108.

Relational database management system 108, is in some embodiments, SAP HANA. The relational database management system 108 is used to store at least: a Governance, Risk, and Compliance (GRC) Repository 110, Function Content 112, and Role Content 114. Alternatively, or in additional embodiments, the relational database management system 108 includes at least one additional database that is used to store at least: a GRC Repository 110, Function Content 112, and Role Content 114.

GRC Repository 110 includes at least data storage related to Assessment Results 116, Rules 118, and Users 120. In some embodiments, different data storage is provided for each of the Assessment Results 116, Rules 118, and Users 120. In some embodiments, shared data storage is provided for the Rules 118 and the Users 120. Function Content 112 includes in some embodiments at least one function 122. In some embodiments, Function Content 112 includes a plurality of functions including function 122, function 2 124, and up to function n 126. Role Content 114 includes at least one of a database relating to: Security Risk Management (SRM) 128, Enterprise Resource Planning (ERP) 130, and Customer Relationship Management (CRM) 132.

A user interface 136 is available on the user-end shell 146. In some embodiments, the user interface 136 includes FIORI Application SAP UI5. In some embodiments, the user interface is a cross platform user interface. In some embodiments, the user interface is capable of integration with any traditional computing platform, including mobile devices, tablets, laptops, and desktop computers.

Using a service that has a standardized protocol for creating and consuming data APIs, data can be consumed from the user interface. In some embodiments, the service having the standardized protocol is OData. In other embodiments, another standardized protocol known to those of ordinary skill in the art is used for this consumption process. In some embodiments, the service having the standardized protocols builds off of other established core protocols such as, but not limited to, Hyper-Text Transfer Protocol (HTTP) and Representational State Transfer (REST) methodologies.

Using a gateway 140 included on the network server 102, data is consumed from the tables available through the user interface 136 by a service. In an example embodiment, the gateway 140 is the Advanced Business Application Programming (ABAP) Gateway. In some embodiments, the data consumption is completed by an ODATA service. In some embodiments, files can be uploaded and or downloaded by a user according to various manipulations executed by the user within the user interface 136 on the shell 146. These files can include data presented with extensions including but not limited to: .doc, .docx, .xls, .xlsx, .ppt, .pptx, .xml, .msg, .pdf, and .txt.

The user-end shell 146, which includes the user interface and which supports any applicable analytics applications needed for the reporting engine, is in some example embodiments a deployable set of pre-packaged applications. In some embodiments, the user-end shell 146 is SAP Fiori. In some embodiments, the user-end shell requires that a user provide authentication, including a user ID that is associated with at least one role, in order to access the user interface.

The system further includes a data information management system (DIMS) 142. In some embodiments, the DIMS is an SLT Replicator. SLT is an example standard SAP landscape replication mechanism. SLT operates based on publication and subscription of different communication lines to the replication mechanism. The utilized replication mechanism creates the same object that was established in the ERP source system and copies it into the appropriate hierarchical position within the target system. In an example embodiment, the object is copied into an appropriate hierarchical position within the relational database. SLT ensures that every single change that occurs within the ERP is mirrored in HANA. Other possible replication mechanisms include the Extract, Transform, Load (ETL) mechanism. Moreover, the HANA cloud interface connectivity can be used as a replication mechanism.

In other embodiments, other replication mechanisms are implemented. The DIMS is, in some embodiments, integrated onto the network server 102. In other embodiments, the DIMS is provided on another server or system external to the network server 102 as is shown in FIG. 1.

The system further includes a platform for applications 144. The platform for applications 144 includes an application server as well as the various applications. In some embodiments, the platform for applications is the R/3 Basis system. At least one application is hosted on the platform, and the platform is capable of hosting any number of applications, including applications related to at least financial accounting, logistics, and human resources management. In some embodiments, applications available in the platform are pre-packaged and/or available to the user based on programs written by the user/designer in the ABAP Workbench using ABAP. As part of R/3 Basis system there is included in the platform for applications 144 a further storage area, an R/3 Repository, in which individual components of application programs are made available. In some embodiments, ERP software is made available through the R/3 Basis system such that processes related to at least one of procurement, manufacturing, services, sales, finances, and human resources are streamlined.

To provide the designed assessment of the stored assessment results, the system further includes, as part of the shell 146, at least one analytics application 138. In some embodiments, the analytics 138 includes at least Lumira Analytics. Data visualization software, such as Lumira, allows for the provided data to represent the final analysis of the assessment results to the user. In some embodiments, the analytics applications can be implemented with or without the SAP HANA in-memory platform.

Within the system described in FIG. 1, different data is saved, recognized, preserved, replicated, compared, and assessed. Different categories of data are saved. The system recognizes data related to the Content of Roles, which is saved on the relational database 108 in Role Content 114. Within the Content of Roles, the system recognizes and assesses data according to Permission Groups. Furthermore, the system recognizes data related to the Content of Functions, which is saved on the relational database in Function Content 112. Within the Content of Functions, the system recognizes and assesses data according to Permission Functions and Action Functions. The system further recognizes data related to Rules 118 and Users 120. Within the Rules 118 on board the GRC Repository 110, the system recognizes and assesses data according to Access Rules, Exception Access Rules, and Critical Access Rules. Within the User 120 on board the GRC Repository 110, the system recognizes and assesses data according to User Assignments. The system further maintains data related to the Assessment Result 116 in GRC Repository 110. Included in the Assessment Result is data related to at least one of Access Risk Analysis and SoD Violations.

A role (or function) that is newly added or changed in the control access must be checked according to permission levels, including Rules and/or Users. In some embodiments, the newly edited roles may affect the relative hierarchical relationship of more than one user. In an example environment having a first user and a second user, both the first user and the second user are employees of the same company and employed at the same company location. The first user is a first year employee and has a basic degree of authority to access and edit information associated with the company databases. The second user is an administrator and has higher degree of authority to access and edit information associated with the company databases, as compared to the first user. In this scenario, if the first user accesses and edits role information to provide himself with greater authority, or if this user attempts to perform a task beyond his authorization credentials, this triggers the permission assessment engine because the first user has generated a content change to the Role Content. Therefore, this alteration triggers an assessment to validate or check the role of the first user.

FIG. 2 is an illustration of the assessment mapping 200 that is performed by the permission assessment engine. In accordance with the above description relating to the information available through the dynamic segregation of duties risk assessment system 100, each of the Role Content, Function Content, Rules Information, and User Information is saved in databases in a table, or similar memory logic structure, provided by the assessment mapping. The Assessment Map 200 includes in some embodiments at least one of: an Action Map 202 (shown in FIG. 2A), a Permission Map 204 (shown in FIG. 2B), a Permission Value Map 206 (shown in FIG. 2C), a Permission Value Details Map 208 (shown in FIG. 2D), and a Role with Assessments Map 210 (shown in FIG. 2E).

FIG. 2A is an illustration of a portion of the assessment mapping 200 that is performed by the permission assessment engine.

Action Map 202 includes Action Functions. Action Functions are included, within the system of FIG. 1, in the Functions 112. Action Map 202 contains fields related to "Function ID", "Action", "System", "Action Assessment ID", and "Active." Function ID includes an identifier for each unique function that is available or updated to the target system. Upon replication by the DIMS 142, additional Action Functions can be added to the Functions 112 of the target system when a trigger is enabled and functions are replicated from the source system to the target system. For each Function ID (e.g., JA11), there is an associated Action, System, Action Assessment ID, and an indicator representing whether or not the Function ID is Active. In some embodiments, a marking "X" indicates that the Function ID for that particular row is Active. In other embodiments, a marking "X" indicates that the Function ID for that particular row is not Active. In some embodiments, other words or characters indicate whether or not the Function ID for a particular row is Active. As shown in FIG. 2A, Function ID JA11 is repeated in two rows, but only one of the Functions with the Function ID JA11 is active. The lower row, without the Active marking, is a historical artifact of function JA11 from a previous update provided by system G17CLNT600. The data provided from system GF8CLNT500 associated with active JA11 is currently implemented and associated with a particular assessment identification number: A1122334455. In some embodiments, Action Assessment ID corresponds to a particular set of tests that is run for the associated Action. The Action Assessment ID is associated with, in an example embodiment, at least one of an Access Risk Analysis and an SoD Violations Analysis.

FIG. 2B is an illustration of a portion of the assessment mapping 200 that is performed by the permission assessment engine.

Permission Map 204 includes Permission Functions. Permission Functions are included, within the system of FIG. 1, in the Functions 112. Permission Map 204 contains fields related to "Action Assessment ID", "Resource ID", and "Permission Assessment ID." As shown above, with regard to FIG. 2A, each unique Function Identifier is assigned an Action Assessment ID. These Action Assessment IDs are each, in turn, associated with at least one Resource ID and at least one Permission Assessment ID. The Resource ID indicates the data, which is either of external to or accessible by the target system, that is accessed by the particular Function in order to complete its callback function task. The Permission Assessment ID indicates the authorization data which limits the parties, or circumstances under which, the Resource identified by the Resource ID can be accessed and/or altered. Provided that the Rules and/or the User satisfy the condition(s) represented by the Permission Assessment ID, the Function can access the Resource at the Resource ID. For example, Action Assessment ID A1122334455 has three different Resource IDs: V_VBAK_ATT, K_KER_TC, and K_KEKO. However, V_VBAK_ATT is only accessible to the Function JA11, having Action Assessment ID A1122334455 when the conditions associated with Permission Assessment ID P1122334455 are met by the requirements instituted by the Rules and Users.

FIG. 2C is an illustration of a portion of the assessment mapping 200 that is performed by the permission assessment engine.

Permission Value Map 206 contains various Permission Values. Permission Values are included, within the system of FIG. 1, in the GRC Repository 110. Permission Values Map 206 contains fields related to "Permission Assessment ID", "Sequence", "ResourceExtn", "Value From", "Value To", "Condition", and "Active." As shown above, with regard to FIG. 2B, the Action Assessment IDs are each, in turn, associated with a Permission Assessment ID. The Resource Extn indicates the data set, which is either of external to or accessible by the target system and that includes the data, that is accessed in order to determine whether the Function and/or Role has authority to complete its request according to the Rules and/or the Users. Provided that the Rules and/or the User satisfy the condition(s) represented by the Permission Assessment ID, the Function and/or Role can access and/or alter the Resource at the Resource ID. Multiple sequences, enumerated for record keeping purposes (i.e., 1, 2, 3, 4 . . . n), can be associated with a same Permission Assessment ID. Different sequences can access different data sets (e.g., Sequence 1 accesses BUKRS and Sequence 4 accesses KOKRS), and different sequences can access the same data set (e.g., Sequence 1 accesses BUKRS and Sequence 2 accesses BUKRS). In some embodiments, the resource data (Resource Extn) is determined based on the origination location of the Role and/or Function data. For example, when the Role is retrieved originally from a US01 database, Sequence 1 is triggered and the data set accessed is BUKRS. In addition, in some embodiments, multiple sequences can be triggered when the "Condition" is set to "AND." In some embodiments, individual sequences are triggered when the "Condition" is set to "OR."

FIG. 2D is an illustration of a portion of the assessment mapping 200 that is performed by the permission assessment engine.

Permission Value Details Map 208 contains a snapshot of the relationships between Permission Value families and an Action Assessment ID. As stated in the foregoing, Permission Values are included, within the system of FIG. 1, in the GRC Repository 110. Permission Value Details Map 208 contains fields related to "Assessment ID", "Groupd ID", "Sequence", "ResourceExtn", "Value From", "Value To", and "Condition." The Permission Value Details Map 208 displays the relationships between the Action Assessment ID A1122334455 and the Permission Assessment IDs P1122334455 and P2233445566. As shown in FIG. 2D, each of the sequences shown in FIG. 2C are applied according to a respective Groupd ID. For example, P1122334455 has four different Groupd IDs (e.g., 1, 2, 3, and 4), and within each of the Groups, the sequence priority described with reference to FIG. 2C is maintained. Groupd IDs correspond to, in some embodiments, different parties and/or different source systems from which a replication is initiated. Within each Group, the Permission Assessment IDs have a sequence. For example, Permission Assessment ID P1122334455 has a Groupd ID 1. Within Groupd ID 1, a first sequence accesses a resource data set from BUKRS when the origination location of the Role and/or Function data is from US01. Within Groupd ID 2, a second sequence accesses a resource data set from KOKRS when the origination location of the Role and/or Function data is from CA01. As shown in FIG. 2C, when the Role and/or Function data has an origination location from US01, this is provided higher sequence than data having an origination location from JP02. This sequence priority is maintained within the Groupd IDs consistently, as is provided for within FIG. 2D.

FIG. 2E is an illustration of a portion of the assessment mapping 200 that is performed by the permission assessment engine.

Role with Assessments Map 210 contains Role information. Role information is included, within the system of FIG. 1, in Role 114. Role with Assessments Map 210 contains fields related to "Role Name (PFCG)", "System", and "Assessment ID." Each Role Name is assigned at least one System and at least one of an Action Assessment ID and a Permission Assessment ID. For example, AP_CLERK is assigned to: System GF8CLNT500, having an Action Assessment of A1122334455; System GI7CLNT600 having an Action Assessment of A9988776655; System GF8CLNT500 having a Permission Assessment of P1122334455; and System GF8CLNT500 having a Permission Assessment of P2233445566. In some embodiments, the Assessment ID (including either the Action Assessment ID or the Permission Assessment ID) corresponds to a particular set of tests that must be executed for the associated Role name. The Assessment ID includes, in one embodiment, at least one of an Access Risk Analysis and an SoD Violations Analysis.

FIG. 3 is an illustration of an Architectural Overview 300 of the layout and relationship between the source system and the target system, which includes the permission assessment engine. The provided Architectural Overview 300 depicts the integration of the permission assessment engine and reporting engine into the target-source system. FIG. 3 includes a Source System 302 and a Target System 304. In some embodiments, the Source System 302 is a SAP Source System. In some embodiments, the Target System 304 is a SAP Target System.

Integrated into the Target System 304 is a Replication Control System 306, a Relational Database System 308, and a Governance System 310. In some embodiments, at least one of Replication Control System 306, Relational Database System 308, and Governance System 310 further includes an additional database. In an example embodiment, Replication Control System 306 is SLT System 306, Relational Database System 308 is SAP HANA System 308, and Governance System 310 is SAP GRC AC System 310. Governance System 310 can further include AC Component 322, GRC Common Component 324, and SAP Basis 326. Each of these sub-systems within the Target System 304 including at least the Replication Control System 306, the Relational Database System 308, and the Governance System 310 is controlled and executed by at least one processing device. In some embodiments, the processing device is included on a server and the processing device is in communication with a computer-readable medium. The computer-readable medium may be a database internal or external to the processing device or external storage means. The computer-readable medium may include instructions executable by the processing device such that when the processing device executes various portions of the instructions, the instructions cause the processing device to perform the various methods described herein.

Integrated into the Source System 302 are a number of modules, including any of Read Modules 312, Application Tables 314, DB Trigger 316, and Logging Tables 318. When a content change to one of the Role or the Function content occurs, the data that has been sent over the connection 320 triggers a check by the Permission Assessment Engine. The modules of the Source System are controlled and executed by at least one processing device. In some embodiments, the processing device is included on a server and the processing device is in communication with a computer-readable medium. The computer-readable medium may be a database internal or external to the processing device or external storage means. The computer-readable medium may include instructions executable by the processing device such that when the processing device executes various portions of the instructions, the instructions cause the processing device to perform the various methods described herein.

The Source System 302 and the Target System 304 are configured to communicate with one another. In some embodiments, this communication is performed over a wired connection. In some embodiments, the communication between the Source System 302 and the Target System 304 is performed over a wireless connection. In some embodiments, the Target System 304 is sourced in the Cloud 328. In some embodiments, both of the Source System 302 and the Target System 304 are sourced in the Cloud 328.

Figure 4:
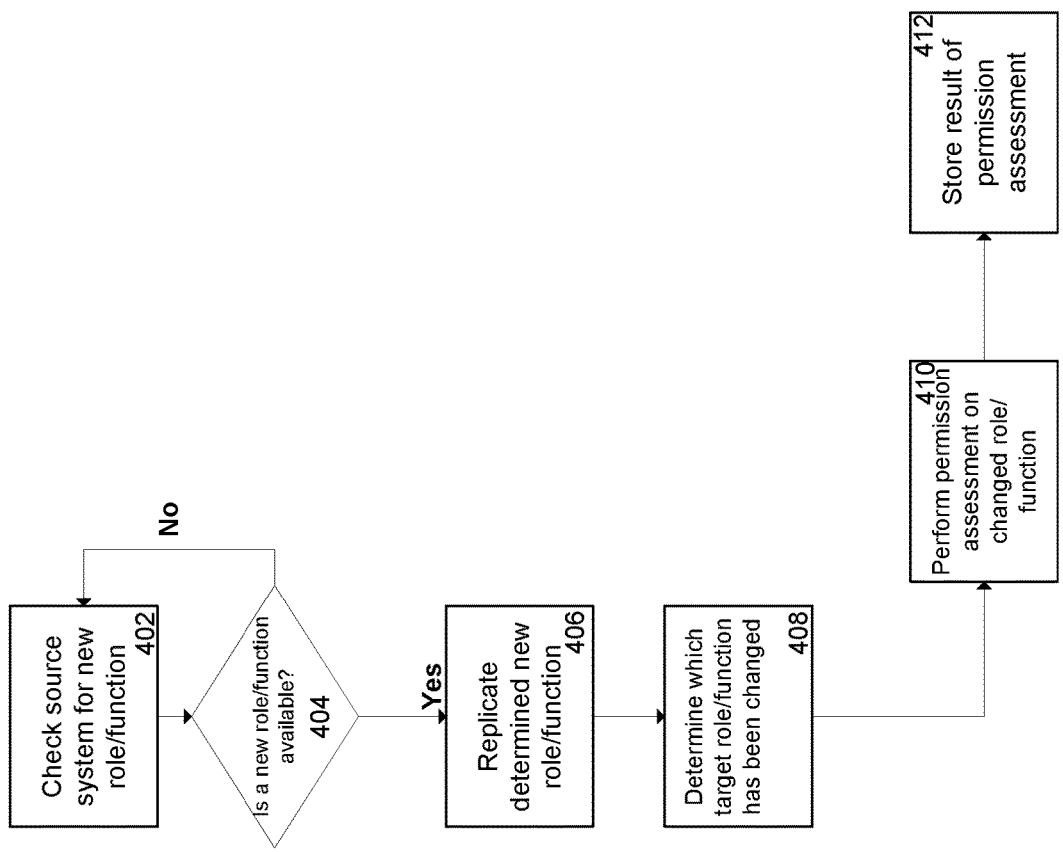
FIG. 4 is an illustration of a method for triggering an assessment by the Permission Assessment Engine.

FIG. 4 is an illustration of a method 400 for triggering an assessment by the Permission Assessment Engine. According to steps 402 to 412, an assessment is triggered and generated by the Permission Assessment Engine.

At 402, the source system is checked for new role information and new function information. The source system is further checked for modified role information and modified function information. In some embodiments, a single source system is checked. In some embodiments, multiple source systems are checked. If multiple source systems are checked, they are checked either in series or in parallel.

At 404, it is determined whether a modified or new role or function information is available at the source system. If the outcome of the determination is that no updated information is available at the source system, the method returns to 402. If the outcome of the determination is that either the modified or new role/function information is available at the source system, the method proceeds to 406.

After the determination is made that new role or new function information is available, step 406 is initiated. The determined new role or function information is replicated into the respective target system role or function information. The replication is performed so as to preserve any associated hierarchical information. In some embodiments, only the new information is replicated using a delta replication mechanism.

At 408, it is determined based on the replication which target roles or functions have been modified or provisioned. The analysis of target roles or functions is performed in real time.

For those replicated target roles or functions, at 410, a permission assessment is performed. In some embodiments, only a delta assessment is triggered when the permission content has changed. The permission assessment is performed at the permission group level, which is the lowest granular level, as opposed to the Risk/Rule level.

After the trigger is executed, it is determined whether or not any changes have been identified in the backend environment. The trigger is, furthermore, specific to the user and the object that were involved in the action.

The trigger performs delta change determinations as opposed to requiring that the entire global database is reviewed for changes on the trigger. A delta check on the object is performed, via a mitigation policy, upon the trigger. When a delta change has been determined within the objects reviewed, the system flags the features that have been added, deleted, or modified in the delta change.

At 412, the results of the permission assessment are stored locally on the target system for reporting. In some embodiments, the results of the permission assessment are automatically generated into a report. In some embodiments, the results of the permission assessment are stored in anticipation of updates prior to a RA request from a user.

Figure 5:
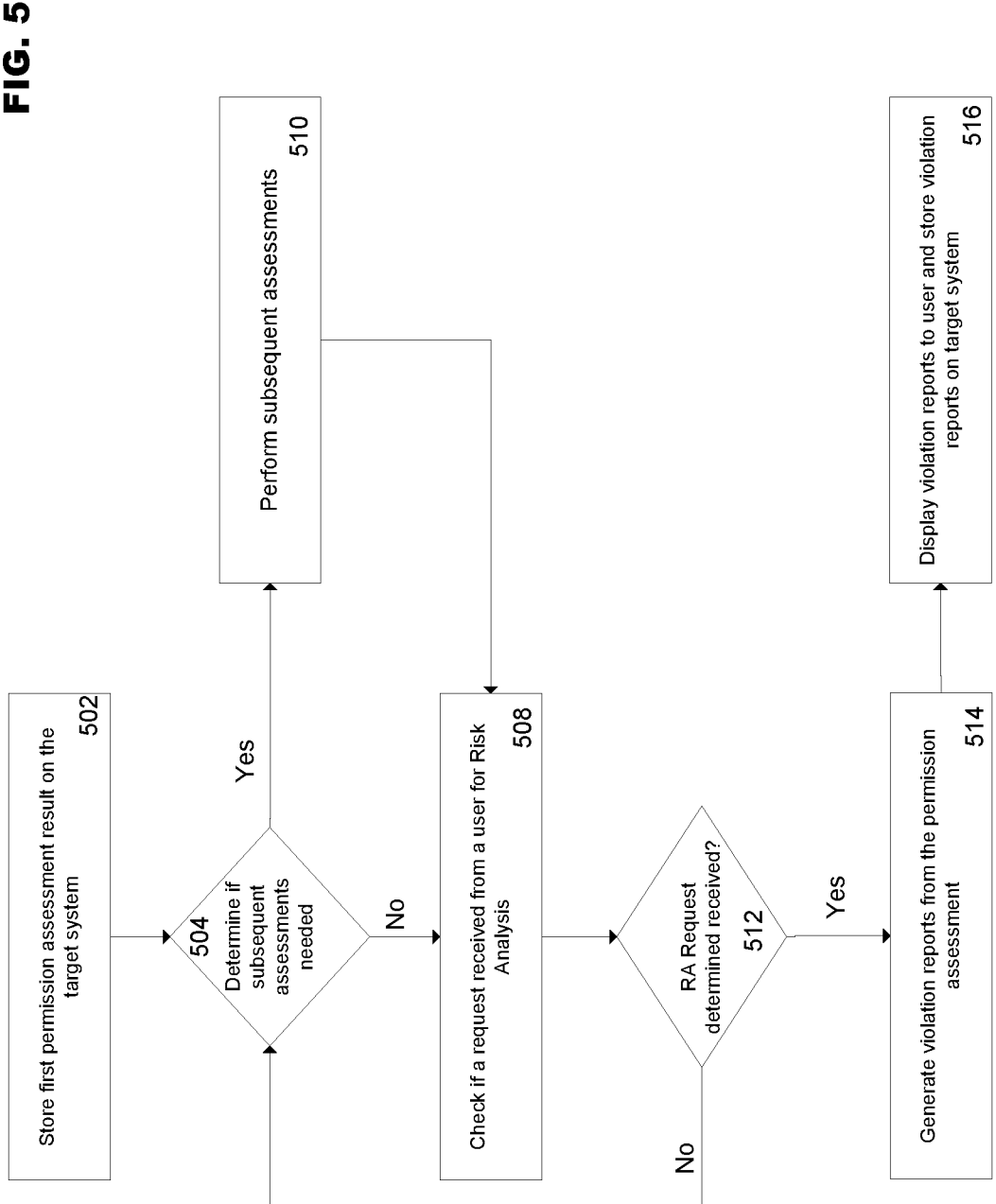
FIG. 5 is an illustration of a method for generating an assessment report by the Reporting Engine consistent with the assessments stored from the permission assessment engine.

FIG. 5 is an illustration of a method 500 for generating a report in assessment for by the Reporting Engine. According to steps 502 to 516, a violation report is generated by the Reporting Engine.

At 502, the method described in FIG. 4 (or another similar method generating a permission assessment) has been completed. The generated permission assessment is stored on the target system.

A determination as to whether additional or subsequent assessments are needed is made at 504. If subsequent assessments are needed, the method proceeds to 510. If no subsequent assessments are needed, the method proceeds to 508.

At 510, the determined subsequent assessments are performed.

Following either 504, or 510, and therefore the completion of the necessary assessments, it is checked whether or not the system has received a request from the user related to Risk Analysis. If the check results in a determination by 512 that the RA request has been received, the method proceeds with 514. If the check results in a determination by 512 that the RA request has not been received, the method returns to 504.

At 514, the violation reports from the stored permission assessments are generated.

At 516, the generated violation reports are shared with the requesting user. In some embodiments, the generated violation reports are further stored on the target system or a remote database for historical analysis.

In some embodiments, the assessment reports, which are automatically generated, can be used to generate predictive analysis for the user's consideration. The predictive analysis further accesses reviews the stored assessment reports, which are based on the delta changes, and implements analysis regarding violation trends and mitigation analysis over a user-selected period of time.

The generated violation report is notably still provided to the user at runtime. Within the reporting framework, the reporting mechanism is uniform for any number of users. The reporting framework is further trigger based, as described in the foregoing. The trigger used to generate the violation report is distinct from the trigger used to initiate the permission assessment engine. In some embodiments, an administrator of the target system can alter what circumstances influence, and the timing of, the trigger that results in the generation of the violation report.

In some embodiments, rules are provided as part of an out of the box ready conceptualization of the permission assessment engine and the reporting engine. For example, the system includes, pre-loaded access rules, exception access rules, critical access rules, and user assignment information. In some embodiment, a user determines which of the available rules provided as part of the out of the box product are to be implemented by selection or de-selection of the rules. Selection or de-selection of the rules could be set up during an installation wizard routine or at any point during the utilization of the product. In models in which the rules are already provided, in some embodiments, the user is provided with the option to add or delete rules for personalization of the rules.

It should be appreciated that the present invention can be implemented in numerous ways, including as a process, an apparatus, a system, a computer processor executing software instructions, or a computer readable medium such as a non-transitory computer readable storage medium, or a computer Network wherein program instructions are sent over optical or electronic communication or non-transitory links. It should be noted that the order of the steps of disclosed processes can be altered within the scope of the invention, as noted in the appended claims and in the description herein.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. For the purpose of clarity, technical material that is known in the technical fields related to the invention has not been described in detail so that the present invention is not unnecessarily obscured.

It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A system for dynamically assessing a permission of a user that one of modifies or adds at least one content change in a source environment, the system comprising:
    a server hosting a target environment including an in-memory relational database that is communicatively coupled to the source environment, the server configured to:
        host predefined data including a set of permissions,
        replicate, from the source environment, the at least one content change onto the target environment,
        dynamically and in real-time assess, by a permission assessment engine executing on the server, at least one of the replicated at least one content change and the permission of the user relative to the set of permissions, and
        store, by the permission assessment engine, the assessment on the target environment within an appropriate hierarchical position within the relational database, wherein the assessment performs both an access risk analysis and a segregation of duties analysis pre-selected by the administrator;
    wherein the server is further configured to generate upon a request from an administrator of the system, a report trigger, and when the report trigger is generated, execute on the server a reporting engine that compiles and displays a report based on the stored assessment;
    wherein the report is used to generate predictive analysis based on delta changes, the predictive analysis being used to implement analysis regarding violation trends and mitigation analysis over a user-selected period of time.

2. The system as recited in claim 1, wherein the at least one content change affects at least one of role data and functional data on the target environment.

3. The system as recited in claim 1, wherein the replicated at least one content change is stored on either a role content database or a function content database of the target environment.

4. The system as recited in claim 3, wherein the set of permissions are stored in a repository database separate from the role content database and the function content database, and wherein the repository database comprises at least one of: rule data relating to at least one of: (i) access rules for the source system, (ii) exceptions to the access rules for the source system, and (iii) critical access rules for the source system, and user assignment data relating to the source system.

5. The system as recited in claim 4, wherein the assessment is stored on the repository database.

6. The system as recited in claim 1, the system further comprising: a user interface, hosted on a shell, that is configured to accept input from the administrator of the system, and a gateway configured to connect the user interface to each of the permission assessment engine and the reporting engine.

7. The system as recited in claim 6, the system further comprising at least one analytics application hosted on the shell and accessible by the administrator via the user interface, wherein the analytics application interacts with the reporting engine to alter a visualization included in the report.

8. The system as recited in claim 1, wherein the replicated at least one content change is generated by a replication mechanism that is hosted on the target system and that is communicatively coupled to the source system and the target system.

9. A computer implemented method for dynamically assessing a permission of a user that one of modifies or adds at least one content change in a source environment, the method comprising:
    determining if the user has created at least one content change on the source environment;
    replicating the at least one content change from the source environment onto a target environment including an in-memory relational database;
    dynamically and in real-time assessing, by a permission assessment engine executing on a server hosting the target environment, at least one of the replicated at least one content change and the permission of the user relative to a set of permissions stored on the target environment;
    storing, by the permission assessment engine, the assessment on the target environment within an appropriate hierarchical position within the relational database, wherein the source environment is hosted on an other server and wherein the other server and the server are communicatively coupled, and wherein the assessment performs at least one of an access risk analysis and a segregation of duties analysis that is pre-selected by the administrator; and
    generating, upon a request from the administrator, a report trigger, and when the report trigger is generated, compiling and displaying a report based on the stored assessment;
    wherein the report is used to generate predictive analysis based on delta changes, the predictive analysis being used to implement analysis regarding violation trends and mitigation analysis over a user-selected period of time.

10. The computer-implemented method of claim 9, wherein the replicated at least one content change is stored on either a role content database or a function content database of the target environment.

11. The computer-implemented method of claim 10, wherein the set of permissions are stored in a repository database separate from the role content database and the function content database, and wherein the repository database comprises at least one of: rule data relating to at least one of: (i) access rules for the source system, (ii) exceptions to the access rules for the source system, and (iii) critical access rules for the source system, and user assignment data relating to the source system.

12. The computer-implemented method of claim 11, wherein the assessment is performed at a permission group level that is a lowest level in a hierarchy of levels of objects on the target environment, and wherein the permission group level is distinct from the rule data.

13. The computer-implemented method of claim 9, wherein an Enterprise Resource Planning (ERP) System is the target environment, and wherein the assessment is executed at regular intervals for the ERP System.

14. The computer-implemented method of claim 9, wherein the at least one content change affects at least one of role data and functional data on the target environment.

15. The computer-implemented method of claim 9, further comprising: receiving, from the administrator via a user interface, input to the target environment; and providing the received input from the administrator to at least one of the permission assessment engine and the reporting engine.

16. The computer-implemented method of claim 15, further comprising: altering a visualization included in the report based on the provided input from the administrator and data from an analytics application that is communicatively coupled to the reporting engine.

17. The computer-implemented method of claim 9, wherein the replicated at least one content change is generated by a replication mechanism that is hosted on the target system and that is communicatively coupled to the source system and the target system.

18. A non-transitory computer readable storage device storing program instructions that, when executed, cause a processing device to perform a method for dynamically assessing a permission of a user that one of modifies or adds at least one content change in a source environment, the method comprising:
   determining if the user has created at least one content change on the source environment;
   replicating the at least one content change from the source environment onto a target environment;
   dynamically and in real-time assessing, by a permission assessment engine executing on a server hosting the target environment, at least one of the replicated at least one content change and the permission of the user relative to a set of permissions stored on the target environment;
   storing, by the permission assessment engine, the assessment on the target environment within an appropriate hierarchical position within the relational database, wherein the source environment is hosted on an other server and wherein the other server and the server are communicatively coupled, and wherein the assessment performs at least one of an access risk analysis and a segregation of duties analysis that is pre-selected by the administrator; and
   generating, upon a request from the administrator, a report trigger, and when the report trigger is generated, compiling and displaying a report based on the stored assessment;
   wherein the report is used to generate predictive analysis based on delta changes, the predictive analysis being used to implement analysis regarding violation trends and mitigation analysis over a user-selected period of time.

19. The computer readable storage device of claim 18, wherein:
   the replicated at least one content change is stored on either a role content database or a function content database of the target environment;
   the set of permissions are stored in a repository database separate from the role content database and the function content database, and wherein the repository database comprises at least one of: rule data relating to at least one of: (i) access rules for the source system, (ii) exceptions to the access rules for the source system, and (iii) critical access rules for the source system, and user assignment data relating to the source system;
   the assessment is performed at a permission group level that is a lowest level in a hierarchy of levels of objects on the target environment, and wherein the permission group level is distinct from the rule data.

20. The computer readable storage device of claim 18, wherein the method further comprises:
   receiving, from the administrator via a user interface, input to the target environment;
   and providing the received input from the administrator to at least one of the permission assessment engine and the reporting engine; and
   altering a visualization included in the report based on the provided input from the administrator and data from an analytics application that is communicatively coupled to the reporting engine.

* * * * *